United States Patent [19]

Cohen et al.

[11] 4,447,594

[45] May 8, 1984

[54] HEAT-CURABLE COMPOSITIONS COMPRISING ISOCYANURIC ACID-ACROLEIN DERIVATIVES

[75] Inventors: Saul M. Cohen, Springfield; John R. LeBlanc, Wilbraham, both of Mass.

[73] Assignee: Monsanto Company, St. Louis, Mo.

[21] Appl. No.: 332,900

[22] Filed: Dec. 21, 1981

[51] Int. Cl.$^3$ .............................................. C08G 2/00
[52] U.S. Cl. .................................. 528/245; 524/101; 526/204; 526/323.1; 526/323.2; 528/73; 528/107; 528/113; 528/118; 528/230; 528/363
[58] Field of Search ................. 528/73, 107, 113, 118, 528/230, 245, 363; 524/101; 526/323.1, 323.2, 204

[56] References Cited

U.S. PATENT DOCUMENTS 4,293,693 10/1981 Cohen et al. ...................... 544/221

*Primary Examiner*—Harry Wong, Jr.
*Attorney, Agent, or Firm*—R. Bruce Blance; William J. Farrington; Paul D. Matukaitis

[57] ABSTRACT

Heat-curable compositions comprising an ester of an ethylenically unsaturated acid and a polyhydric alcohol, an oxopropyl isocyanurate formed by the addition of from 2 to 3 moles of acrolein to 1 mole of isocyanuric acid and a free radical or ionic initiator. The compositions are useful as coatings, adhesives and the like.

6 Claims, No Drawings

HEAT-CURABLE COMPOSITIONS COMPRISING ISOCYANURIC ACID-ACROLEIN DERIVATIVES

BACKGROUND OF THE INVENTION

This invention relates to heat-curable compositions containing polyunsaturated compounds and isocyanuric acid-acrolein derivatives and to a process of curing such derivatives.

Polyunsaturated compounds containing activated unsaturated groups such as acrylic groups polymerize readily when they are heated in the presence of free radical or ionic initiators. However when the compounds are applied as coating compositions, the curing reaction is inhibited by the presence of air and long reaction times or high curing temperatures are required to provide hard coatings. We have found that the addition of polyaldehyde adducts of isocyanuric acid and acrolein or the hemiacetals of such polyaldehyde adducts to the polyunsaturated compounds allows cure to occur more readily at substantially lower curing temperatures or in substantially shorter times.

One aspect of our invention is directed to a heat-curable coating composition comprising about 50 to about 90 parts by weight of an ester of an ethylenically unsaturated acid and a polyhydric alcohol, about 10 to about 50 parts by weight of a polyaldehyde adduct of isocyanuric acid and acrolein or a hemiacetal of the polyaldehyde adduct and an effective amount of an initiator. Another aspect of the invention is directed to a process of curing the composition by heating it to an effective temperature for initiation of the free-radical or ionic cure.

The polyunsaturated compounds of the compositions of the present invention are esters of an ethylenically unsaturated acid and a polyhydric alcohol. Advantageously the ethylenically unsaturated acid is selected from the group consisting of acrylic acid, methacrylic acid and itaconic acid and is preferably acrylic acid. Advantageously the polyhydric alcohol has a number average molecular weight of less than about 1000. Such polyhydric alcohols include hydrocarbyl polyols, ether polyols, ester polyols, amide polyols, urethane polyols, and cyclic nitrogen-containing polyols.

The hydrocarbyl polyols include ethylene glycol, 1,2-propanediol; 1,3-propanediol; 1,2-butanediol; 1,3-butanediol; 1,4-butanediol; 2,3-butanediol; 1,6-hexanediol; 2,4-pentanediol; 1,5pentanediol; 2,5-hexanediol; 2-methyl-1,3-pentanediol; 2-methyl-2,4-pentanediol; 2,4-heptanediol; 2-ethyl-1,3-hexanediol; 2,2-dimethyl-1,3-propanediol; 1,2-cyclohexanediol; 1,4-cyclohexanediol; 1,4-bis(hydroxymethyl)cyclohexane; 2,2-diethylpropanediol-1,3; 2,2-diethylbutanediol-1,3; butene-2-diol-1,4; trimethylolpropane; trimethylolethane; glycerol; 1,2,4-butanetriol; 1,2,6-hexanetriol; erythritol, D-threitol; L-threitol; sorbitol and D-mannitol.

The ether polyols include polyalkylene glycols such as diethylene glycol, triethylene glycol, dipropylene glycol, diglycerol, poly(tetramethylene ether)glycols 2,2-bis(hydroxyethoxyphenyl)propane, 2,2-bis(hydroxypropoxyphenyl)propane, polyols formed by hydrolysis of the glycidyl groups of epoxy resins, and ether polyols formed by addition of alkylene oxide, such as ethylene oxide and propylene oxide to any of the above-described hydrocarbyl polyols.

The ester polyols include esterification products obtained by esterification of any of the above-described hydrocarbyl polyols and ether polyols with polycarboxylic acids such as phthalic, isophthalic, terephthalic, trimellitic, pyromellitic, tetrahydrophthalic, hexahydrophthalic, adipic, azelaic, sebacic, malic, glutaric, chlorendic, tetrachlorophthalic, maleic, fumaric, itaconic, malonic, pimelic, suberic, 2-methylsuccinic, 2,3-dimethylsuccinic, 3,3-diethylglutaric, 3,3-dimethyl glutaric, 2,2-dimethylglutaric, 2,2-dimethylsuccinic and the like. Anhydrides of these acids, where they exist, can also be employed and are encompassed by the term "dicarboxylic acid". Finally, certain materials which react in a manner similar to acids to form polyester polyols are also useful. Such materials include lactones such as caprolactone, propiolactone, and methyl caprolactone, and hydroxy acids such as tartaric acid. If a triol or higher alcohol is used, some monocarboxylic acid, such as acetic acid, may be used with the polycarboxylic acid to form the polyester polyol oligomer, and for some purposes, such a composition would be highly desirable.

The amide polyol oligomers useful in the instant invention are produced from any of the above-described polyacids or lactones and diols, triols and higher alcohols, and small amounts of diamines or aminoalcohols. Suitable diamines and aminoalcohols include hexamethylene diamine, ethylene diamine, monoethanolamine, phenylenediamines, toluene-diamines, diethanolamines and the like.

The polyurethane polyol oligomers useful in the instant invention are produced by reacting any of the above-described polyols, including diols, triols and higher alcohols, ether-containing polyols, polyester polyol oligomers and polyester ether polyol oligomers as herein before described with an organic polyisocyanate.

The polyisocyanate which is reacted with the polyol can be essentially any organic polyisocyanate, e.g., hydrocarbon polyisocyanates or substituted hydrocarbon polyisocyanates. Many such organic polyisocyanates are known in the art, including p-phenylene diisocyanate, biphenyl diisocyanate, toluene diisocyanate, 3,3'-dimethyl-4,4'-diphenylene diisocyanate, 1,4-tetramethylene diisocyanate, hexamethylene diisocyanate, 2,2,4-trimethylhexane-1,6-diisocyanate, methylene-bis(phenylisocyanate), lysine methyl ester diisocyanate and methyl cyclohexyl diisocyanate.

While diisocyanates are preferred, higher polyisocyanates can be utilized as part of the organic polyisocyanate. Examples are 1,2,4-benzene triisocyanate and polymethylene polyphenyl isocyanate.

It is preferred to employ an aliphatic diisocyanate, since it has been found that these provide better color stability in the finished coating. Examples include bis-(isocyanatocyclohexyl)methane, 1,4-butylene diisocyanate, methylcyclohexyl diisocyanate, and isophorone diisocyanate.

The conditions of the reaction between the polyol and the polyisocyanate are chosen so as to produce an hydroxyl-containing urethane reaction product of low molecular weight, i.e., a polyurethane polyol oligomer. In general, this is accomplished by utilizing an equivalent ratio of isocyanate groups to hydroxyl groups of less than about one, and allowing substantially all the isocyanate groups present to react.

Suitable cyclic nitrogen-containing polyols include such compounds as tris(hydroxyethyl)isocyanurate (THEIC); N,N'-bis(hydroxyethyl)dimethyl hydantoin (BHDH); 1,4-bis [4,4-bis(hydroxymethyl)-1,3-oxazol- 2-ene-2-yl]butane; hydroxylated THEIC; hydroxyalkylated BHDH; bis(hydroxyethyl)ethylene urea; 4,4-bis(hydroxymethyl)-1,3-oxazolidin-2-one; hexamethylolmelamine and hexamethylolmelamine partly etherified with a $C_1$ to $C_6$ monohydric alcohol and hexamethylolmelamine etherified with a $C_1$ to $C_6$ monohydric alcohol and a dihydric alcohol such as ethylene glycol or propylene glycol.

The cyclic nitrogen-containing polyols may be used by themselves or they may be reacted with any of the above-described acids to form ester groups or with any of the above-described polyisocyanates to form urethane groups.

The polyunsaturated compounds are prepared by conventional means by interaction of the ethylenically unsaturated acid, or its anhydride, or acid halide or ester with the polyhydric alcohol or derivative thereof or by interaction of a hydroxyester such as a 2-hydroxyethyl ester of the ethylenically unsaturated acid with a polyisocyanate, a polyacid or an alkoxymethylmelamine. On average at least about two ethylenically unsaturated acid moieties are attached to the polyhydric alcohol moiety.

The polyaldehyde adducts of isocyanuric acid and acrolein are obtained by adding on average at least about 2 moles of acrolein to one mole of isocyanuric acid. Such adducts, and their method of preparation are described in copending application Ser. No. 219,209, filed Dec. 22, 1980 now U.S. Pat. No. 4,326,057. They comprise monomeric bis(3-oxopropyl)isocyanurate and tris(3-oxopropyl)isocyanurate and oligomers thereof. They may be conveniently used as such or in the form of their hemiacetals prepared by interaction with monohydric alcohols, preferably the lower boiling $C_1$ to $C_8$ alcohols, as described in the above cited copending application which is incorporated herein in full.

The weight ratio of polyunsaturated compound to adduct of isocyanuric acid and acrolein or hemiacetal thereof is advantageously in the range of about 1:1 to about 9:1 and is preferably in the range of 7:3 to about 8.5:1.

The compositions of the present invention can advantageously include vinyl monomers, the preferred vinyl monomers being styrene, acrylonitrile, acrylic acid, methacrylic acid and esters of $C_1$–$C_8$ monohydric alcohols and acrylic or methacrylic acid such as methyl acrylate, butyl acrylate, butyl methacrylate, octyl acrylate and 2-ethylhexyl methacylate. The amount of such monomer is preferably in the range of 10 to about 100 parts by weight per 100 parts by weight of polyunsaturated compound and polyaldehyde derivative of isocyanuric acid and acrolein.

The initiators for the heat-cure of the compositions may be any of the conventional free-radical or ionic initiators selected to provide compositions which are stable at room temperature but to initiate cure at temperatures in the range of about 55° to about 120° C. The free-radical initiators advantageously have a ten-hour half life in the temperature range of about 35° to about 90° C. Such initiators include isopropyl peroxide, bis(4-t-butylcyclohexyl)peroxycarbonate, lauroyl peroxide and benzoyl peroxide. The ionic initiators are selected advantageously from the moderately active Lewis acid catalysts which are soluble in organic coating systems, for example boron trifluoride etherate, zinc chloride and stannic chloride. The amount of initiator used in the coating compositions is an amount effective for thermal cure preferably at a temperature in the range of about 55° to about 120° C. and is advantageously in the range of 0.01 to about 5 parts by weight per 100 parts by weight of the polyunsaturated component of the coating composition.

When the initiator is a free-radical initiator, from about 0.01 to about 0.5 equivalents of chain transfer agent per equivalent of free-radical initiator may be included in the coating composition to modify the cure response of the composition.

The coating compounds of the present invention are suitable for use in the absence of solvents and in the presence of oxygen as vehicles for paints, lacquers, and printing inks which are capable of setting or hardening after printing by exposure to heat. They are suitable also as adhesives for foils, films, papers, fabrics, and the like and as coatings for metals, plastics, paper, wood, foils, textiles, glass, cardboard, box board, and the like.

Various dyestuffs, pigments, plasticizers, lubricants, stabilizers, flow control agents, levelling agents and other modifiers may be incorporated in the coating compositions to obtain certain desired characteristics in the finished products. The coatings may be applied by any conventional technique such as spraying, roll coating, dip coating, flow coating etc., to an average depth in the range of about 0.1 to about 4 mils.

The following examples are set forth in illustration of the invention and should not be construed as limitations thereof. Parts and percentages are by weight unless otherwise indicated.

EXAMPLE 1

A solid polyaldehyde adduct was obtained by the addition of three moles of acrolein to one mole of isocyanuric acid under mildly acid conditions. The polyaldehyde had an equivalent weight of 99 and contained one aldehyde group per equivalent when it was analyzed by the conventional hydroxylamine method. It was comprised substantially of tris(3-oxopropyl)isocyanurate. The solid (22.2 parts by weight) was fused to a viscous liquid at 100° C. and was mixed with ethylene glycol monomethyl ether (5.7 parts) to form the hemiacetal, a liquid at room temperature. 41.4 parts of 1,6-hexanediol diacrylate was mixed with the hemiacetal, followed by 0.4 parts of a commercial flow control agent sold by the 3M Company under the tradename FC-430, and 1.4 parts of bis(4-t-butylcyclohexyl)peroxydicarbonate in 14.1 parts of acetone. The coating composition was applied to cathodic, EDP primed test panels by means of a draw-down blade to give coatings of about 50 microns in thickness. The coatings were cured for 30 minutes at 82° C. They were clear and glossy; their pencil hardness was 2H; they survived 200 MEK rubs and possessed good humidity resistance, UV durability and salt-fog resistance.

When the tris(3-oxopropyl) isocyanurate component was omitted from the composition, cure of the coating composition after 30 minutes at 82° C. was insufficient to provide a solvent-resistant coating.

EXAMPLE 2

The tris(3-oxopropyl)isocyanurate composition of example 1 (21.6 parts by weight) was reacted with 4.3 parts by weight of 1-propanol and the liquid hemiacetal was mixed with 50.3 parts of 1,6-hexanediol diacrylate, 1.08 parts of bis(4-t-butylcyclohexyl)peroxydicarbonate, 0.14 parts of zinc chloride, 12.9 parts of methanol, and 9.7 parts of cyclohexanone. The coating composition was applied to test panels to give films of about 50 microns dry thickness. The coatings were heated at 71° C. for 30 minutes. They developed a pencil hardness of 2H, and good solvent resistance.

When the tris(3-oxopropyl)isocyanurate component was omitted from the composition, cure for 30 minutes at 71° C. was insufficient to provide a solvent-resistant coating.

EXAMPLE 3

16.7 parts by weight of the tris(3-oxopropyl)isocyanurate composition of example 1 was mixed with 66.7 parts of triethyleneglycol diacrylate, 0.83 parts of zinc chloride, 7.5 parts of methanol and 8.3 parts of acetone to provide a liquid coating composition. The composition was coated on test panels to provide a coating thickness of 30 microns dry thickness. After 30 minutes at 107° C., the coatings possessed a 4H hardness and good solvent resistance.

EXAMPLE 4

16.3 parts by weight of the tris(3-oxopropyl)isocyanurate composition of example 1 was mixed with 12.2 parts of acrylic acid, 40.7 parts of the reaction product of 1 mole bisphenol A diglycidyl ether and 2 moles acrylic acid, 26 parts of butyl acrylate, 0.2 parts of flow control agent FC-430, 2,4 parts of bis(4-t-butylcyclohexyl)peroxydicarbonate and 2.2 parts of methyl ethyl ketone to provide a liquid coating composition. The composition was coated on test panels to provide a dry thickness of 30 microns. The coatings were cured for 30 minutes at 82° C. to develop a pencil hardness of 4H and good solvent resistance.

When the tris(3-oxopropyl)isocyanurate was replaced with trimethylolpropane triacrylate, the coatings required 30 minutes at 107° C. to develop equivalent properties.

EXAMPLE 5

A coating composition was prepared by blending 22.7 parts by weight of the tris(3-oxopropyl)isocyanurate composition of example 1 with 51.5 parts of an acrylylterminated urethane sold by Thiokol Corporation under the tradename Uvithane, 0.2 parts of flow-control agent FC-430, 2.9 parts of benzoyl peroxide and 22.7 parts of tetrahydrofuran. The coating composition was applied to test panels and cured at 107° C. for 30 minutes to give coatings with good solvent resistance.

Similar results were obtained with 2.9 parts of boron trifluoride ethyl etherate in place of benzoyl peroxide.

What is claimed is:

1. A heat-curable coating composition comprising (1) about 50 to about 90 parts by weight of a polyunsaturated ester of an ethylenically unsaturated acid and a polyhydric alcohol, (2) about 10 to about 50 parts by weight of a polyaldehyde adduct formed from 1 mole of isocyanuric acid and from about 2 to about 3 moles of acrolein or a hemiacetal of the polyaldehyde adduct and a monohydric alcohol and (3) an effective amount of a free-radical or ionic initiator.

2. The composition of claim 1 wherein the amount of initiator is from about 0.01 to about 5.0 parts per weight per 100 parts by weight of the ester.

3. The composition of claim 2 wherein the initiator is a free-radical initiator and the composition comprises additionally from about 0.01 to about 0.5 equivalents of a chain transfer agent per equivalent of free-radical initiator.

4. The composition of claim 1, 2 or 3 wherein the ethylenically unsaturated acid is selected from the group consisting of acrylic acid, methacrylic acid and itaconic acid.

5. The composition of claim 1, 2 or 3 wherein the polyhydric alcohol has a number average molecular weight of less than about 1000.

6. A process of curing the composition of claim 1 which comprises heating the composition to an effective temperature for initiation of the cure.

* * * * *